US011993428B2

(12) United States Patent
Mayer

(10) Patent No.: US 11,993,428 B2
(45) Date of Patent: May 28, 2024

(54) CLOSEABLE CARTON

(71) Applicant: Inno-Pak, LLC, Delaware, OH (US)

(72) Inventor: Steven A. Mayer, Indianapolis, IN (US)

(73) Assignee: Inno-Pak, LLC, Delaware, OH (US)

( * ) Notice: Subject to any disclaimer, the term of this patent is extended or adjusted under 35 U.S.C. 154(b) by 0 days.

(21) Appl. No.: 17/704,473

(22) Filed: Mar. 25, 2022

(65) Prior Publication Data

US 2022/0212831 A1 Jul. 7, 2022

Related U.S. Application Data

(63) Continuation of application No. 29/727,102, filed on Mar. 9, 2020.

(51) Int. Cl.
*B65D 5/20* (2006.01)
*B31B 50/00* (2017.01)
(Continued)

(52) U.S. Cl.
CPC .......... *B65D 5/2057* (2013.01); *B31B 50/004* (2017.08); *B31B 50/62* (2017.08);
(Continued)

(58) Field of Classification Search
CPC .... B65D 5/2057; B65D 5/244; B65D 5/4295; B65D 5/6661; B65D 5/241; B65D 5/2061;
(Continued)

(56) References Cited

U.S. PATENT DOCUMENTS

D73,127 S 7/1927 Greve
2,019,870 A 11/1935 Perry
(Continued)

FOREIGN PATENT DOCUMENTS

GB 2088269 A 11/1999

OTHER PUBLICATIONS

"Bowl Sleeve", The Custom Packaging Boxes, Available from internet, https://thecustompackagingboxes.com/boxes-by-style/bowl-sleeve/, 2018, 04 pages.
(Continued)

*Primary Examiner* — Christopher R Demeree
(74) *Attorney, Agent, or Firm* — Ward and Smith, P.A.; Ryan K. Simmons

(57) ABSTRACT

A carton. The carton may include a floor panel; a plurality of side panels extending about a periphery of the floor panel, a front tab formed at an upper edge of a front side panel, upper side flaps extending from upper edges of a first end side panel and a second end side panel, and wherein each flap includes a side receiving slot; foldable corner gussets extending between adjacent side panels, wherein the floor panel, side panels, and foldable corner gussets are configurable to form a compartment region; a hingeable lid, including: a lid panel, a front edge flap, a side tab formed on each opposing side edge of the lid panel, and a front receiving slot formed in the front edge flap, wherein the lid panel is configured to cover the compartment region when in a closed position; and wherein the front tab of the front side panel is configured such that when the hingeable lid is in the closed position, the front tab aligns with the front receiving slot and is receivable therein and each side tab aligns with its respective side receiving slot and are receivable therein.

19 Claims, 13 Drawing Sheets

(51) Int. Cl.

| | |
|---|---|
| ***B31B 50/62*** | (2017.01) |
| ***B31B 50/73*** | (2017.01) |
| ***B31B 105/00*** | (2017.01) |
| ***B31B 120/00*** | (2017.01) |
| ***B31B 120/10*** | (2017.01) |
| ***B65D 5/24*** | (2006.01) |
| ***B65D 5/42*** | (2006.01) |
| ***B65D 5/66*** | (2006.01) |

(52) U.S. Cl.

CPC ............ *B31B 50/734* (2017.08); *B65D 5/244* (2013.01); *B65D 5/4295* (2013.01); *B65D 5/6661* (2013.01); *B31B 2105/0024* (2017.08); *B31B 2120/102* (2017.08); *B31B 2120/502* (2017.08)

(58) Field of Classification Search

CPC . B65D 5/24; B65D 5/247; B65D 5/28; B65D 5/563; B65D 5/6658; B65D 2543/00833

USPC ................ 229/148, 186, 155, 126, 151, 157

See application file for complete search history.

(56) References Cited

U.S. PATENT DOCUMENTS 2,062,949 A 12/1936 Taylor
D106,826 S 11/1937 Dieffenbach
D126,123 S 3/1941 Clemens
2,341,762 A 2/1944 Conklin
2,355,729 A 8/1944 Inman
2,409,736 A 10/1946 Caimi
2,475,294 A 7/1949 Rafoth
D158,362 S 5/1950 Dischler
2,568,170 A 9/1951 Ringler
2,786,572 A 3/1957 Gentry
2,793,801 A 5/1957 Papadopoulos
D183,716 S 10/1958 James
2,927,502 A 3/1960 Watrous
3,027,063 A 3/1962 Zastrow
D194,246 S 12/1962 Engelmann
3,067,924 A * 12/1962 Baker .................... B65D 5/247 229/160
D200,249 S 2/1965 Hancock
3,367,557 A 2/1968 Farquhar
D211,564 S 7/1968 Bailey
3,391,816 A 7/1968 Swett
D212,495 S 10/1968 Stageberg
3,443,681 A 5/1969 Wysocki
D214,523 S 6/1969 Stone et al.
D217,441 S 5/1970 Kanaga
D219,263 S 11/1970 Castelli et al.
3,595,425 A 7/1971 Eicholtz et al.
3,604,614 A 9/1971 Sternfeld
3,640,380 A 2/1972 Huffman
D224,090 S 7/1972 Cyr et al.
3,701,181 A 10/1972 Lock
D232,302 S 8/1974 Lazure
D232,524 S 8/1974 Schy
3,853,220 A 12/1974 Luray
D241,016 S 8/1976 Reynold
D255,011 S 5/1980 Cooper et al.
D259,615 S 6/1981 Morris, Jr.
D260,604 S 9/1981 Otto
D276,137 S 10/1984 Vere et al.
4,529,464 A 7/1985 Jones
D280,290 S 8/1985 Bakus
4,596,356 A 6/1986 Chaussadas
4,844,328 A 7/1989 Cooper
4,846,398 A 7/1989 Johnson
D329,376 S 9/1992 Burd
5,226,588 A 7/1993 Schramm et al.
5,322,182 A 6/1994 Fritz
D351,997 S 11/1994 Finnah
D352,203 S 11/1994 Campbell et al.
5,411,204 A 5/1995 DeMay
5,419,451 A 5/1995 Bitel, Jr.
D363,192 S 10/1995 Reeves et al.
D363,856 S 11/1995 Westbrooks, Jr.
5,484,059 A 1/1996 Sutherland
D367,172 S 2/1996 Brightbill et al.
D371,940 S 7/1996 Krupa
D372,170 S 7/1996 Ahern, Jr.
D376,953 S 12/1996 Dunn
D394,385 S 5/1998 Laughlin
D395,547 S 6/1998 Sussman
5,765,685 A 6/1998 Roosa
D397,294 S 8/1998 Saulas
D398,526 S 9/1998 Schwarz et al.
5,855,275 A 1/1999 Hunter et al.
5,873,220 A 2/1999 Haraldsson et al.
D409,908 S 5/1999 Besana
5,927,502 A 7/1999 Hunter
D412,398 S 8/1999 Watabe
D440,118 S 4/2001 Claffy et al.
D442,859 S 5/2001 Hirschey
D444,703 S 7/2001 Allasia
D445,311 S 7/2001 Emonet et al.
D448,130 S 9/2001 Wagner
D451,769 S 12/2001 Stanos et al.
D454,495 S 3/2002 Bryan et al.
D460,689 S 7/2002 Robinson
D461,406 S 8/2002 Iacovelli
D467,798 S 12/2002 Cohon
6,612,482 B2 9/2003 Ross
D484,364 S 12/2003 Bailey et al.
D484,799 S 1/2004 Hoffman et al.
D495,251 S 8/2004 Zack
D497,309 S 10/2004 Nordland et al.
D500,674 S 1/2005 Chou
D504,813 S 5/2005 Chou
D509,733 S 9/2005 Jongens
D512,836 S 12/2005 Marnell, II
7,004,314 B2 2/2006 Pucillo et al.
D519,366 S 4/2006 Epstein
D519,830 S 5/2006 Yocum
D521,376 S 5/2006 Mosto
D521,862 S 5/2006 Siethoff et al.
D531,498 S 11/2006 Fluegel et al.
D542,129 S 5/2007 Moorman
D549,456 S 8/2007 Dretzka
D549,457 S 8/2007 Dretzka
D557,047 S 12/2007 Dretzka
D561,023 S 2/2008 Jacxsens
D561,408 S 2/2008 Marsh
D562,125 S 2/2008 Kienemund-Paroll
D563,673 S 3/2008 Dretzka
D567,671 S 4/2008 Say Ulin
D568,765 S 5/2008 Miles
D573,408 S 7/2008 Lovett
D573,409 S 7/2008 Lovett
D576,482 S 9/2008 DeBusk
D578,387 S 10/2008 Lovett
D582,268 S 12/2008 Zanaletti
D582,791 S 12/2008 Elmerhaus
D584,108 S 1/2009 Olsson
D590,596 S 4/2009 Dretzka
D595,155 S 6/2009 Larson
D596,027 S 7/2009 Kalberer
D596,448 S 7/2009 Nolan
D596,449 S 7/2009 Nolan
D596,903 S 7/2009 Willis et al.
7,565,997 B1 7/2009 Lim
D599,611 S 9/2009 Hoekstra
D605,896 S 12/2009 Zalewski et al.
D608,153 S 1/2010 Furlong
D615,822 S 5/2010 Klein
D622,139 S 8/2010 Marcott et al.
D630,508 S 1/2011 Hubbard, Jr. et al.
D630,885 S 1/2011 Stein
D631,741 S 2/2011 Hubbard, Jr. et al.
D631,742 S 2/2011 Hubbard et al.
D631,743 S 2/2011 Hubbard, Jr. et al.
D633,341 S 3/2011 Smyers

(56) References Cited

U.S. PATENT DOCUMENTS

D635,469 S 4/2011 Buitrago
D641,256 S 7/2011 Fisher
D642,934 S 8/2011 Ly
D643,311 S 8/2011 Meyers
D645,708 S 9/2011 Stamper et al.
8,061,585 B2 11/2011 Nikolai et al.
D649,838 S 12/2011 Stamper et al.
D652,316 S 1/2012 Ren et al.
D653,496 S 2/2012 Henry
D657,261 S 4/2012 de Gast
D665,271 S 8/2012 Halty et al.
D665,628 S 8/2012 Mayer
D669,352 S 10/2012 Paslawski
D674,690 S 1/2013 Sill
D675,092 S 1/2013 Sill
D675,520 S 2/2013 Sill
D675,920 S 2/2013 Sill
D676,742 S 2/2013 Walter et al.
D678,760 S 3/2013 Cooper
D678,761 S 3/2013 Cooper
D678,762 S 3/2013 Cooper
D678,779 S 3/2013 Lee
D679,950 S 4/2013 Cooper
D682,085 S 5/2013 Hannant et al.
D682,684 S 5/2013 Walter et al.
D684,465 S 6/2013 Vernon et al.
D684,858 S 6/2013 Sill
D688,552 S 8/2013 Vernon et al.
D688,572 S 8/2013 Marin
D688,921 S 9/2013 Miros et al.
D691,035 S 10/2013 Sill
D693,180 S 11/2013 Peterson et al.
D693,215 S 11/2013 Sill
D693,216 S 11/2013 Sill
D693,217 S 11/2013 Sill
D693,218 S 11/2013 Sill
D693,646 S 11/2013 Katterheinrich et al.
D693,679 S 11/2013 Sill
D695,101 S 12/2013 Keberlein et al.
D695,104 S 12/2013 Sill
D695,107 S 12/2013 Clements
D695,575 S 12/2013 Katz
D695,605 S 12/2013 Johnson
D697,789 S 1/2014 Gerdes et al.
D706,132 S 6/2014 Sill
D707,042 S 6/2014 Ruzzenente
D707,123 S 6/2014 Marchetti et al.
D710,691 S 8/2014 Genender
D712,153 S 9/2014 Lee
D714,638 S 10/2014 Mohn et al.
D718,641 S 12/2014 Ryan et al.
8,939,350 B2 1/2015 Valencia
D726,533 S 4/2015 Northrup
D727,724 S 4/2015 Pipes et al.
D727,732 S 4/2015 Petty
D728,359 S 5/2015 Iwegbu
D728,364 S 5/2015 Baker et al.
D730,178 S 5/2015 Fullan
D731,325 S 6/2015 Loessin
D735,576 S 8/2015 Aldridge
D737,820 S 9/2015 Yu et al.
D742,759 S 11/2015 Ryan et al.
9,211,970 B2 12/2015 Hubbard, Jr. et al.
9,212,842 B2 12/2015 Vasbinder et al.
9,216,837 B2 12/2015 Hubbard et al.
D746,643 S 1/2016 Kraemer
D746,671 S 1/2016 Fohner et al.
D752,429 S 3/2016 Mayer
9,309,023 B2 4/2016 Hubbard, Jr. et al.
D758,184 S 6/2016 Tu et al.
D760,036 S 6/2016 Hucuptan
D763,706 S 8/2016 Shum et al.
D764,276 S 8/2016 Das et al.
D764,281 S 8/2016 Mayer
D766,664 S 9/2016 Wilson et al.
D767,409 S 9/2016 Nickell
D769,732 S 10/2016 Shoshan
D770,270 S 11/2016 McGarry et al.
D771,486 S 11/2016 Mayer
D772,053 S 11/2016 Mayer
9,505,516 B2 * 11/2016 Hubbard, Jr. ........ B65D 5/2057
D775,946 S 1/2017 Ghini et al.
D776,548 S 1/2017 Bell
D777,029 S 1/2017 Stratton
D778,115 S 2/2017 Strachan
D778,155 S 2/2017 Strachan
D778,722 S 2/2017 Strachan
D784,769 S 4/2017 Beckman et al.
D786,621 S 5/2017 Davis
D792,160 S 7/2017 Ng
D792,161 S 7/2017 Ng
D792,211 S 7/2017 Foster et al.
D792,222 S 7/2017 Sill et al.
D792,761 S 7/2017 Duval et al.
D793,868 S 8/2017 Kim et al.
D798,707 S 10/2017 Mayer
D798,736 S 10/2017 Shoshan
D809,849 S 2/2018 Lee
D809,930 S 2/2018 Kagawa
D809,931 S 2/2018 Kagawa
D814,929 S 4/2018 Bergeron et al.
D815,941 S 4/2018 Haddad
D815,955 S 4/2018 Park et al.
10,017,290 B2 7/2018 Faulkner et al.
D828,099 S 9/2018 Zhang
D828,157 S 9/2018 Paradis
D828,766 S 9/2018 Latour et al.
D829,563 S 10/2018 Park et al.
D830,193 S 10/2018 Park et al.
D830,852 S 10/2018 Sill et al.
D836,449 S 12/2018 Park et al.
10,167,134 B2 1/2019 Zeitlin et al.
D840,232 S 2/2019 Sill et al.
D849,553 S 5/2019 Song et al.
D850,932 S 6/2019 Troudt et al.
D850,933 S 6/2019 Troudt et al.
D854,942 S 7/2019 Requena et al.
D854,943 S 7/2019 Requena et al.
D858,270 S 9/2019 Requena et al.
D869,289 S 12/2019 Sill et al.
D875,530 S 2/2020 Sill et al.
D876,951 S 3/2020 Sill et al.
10,829,262 B2 * 11/2020 Sill ........................ B65D 5/241
2002/0108955 A1 8/2002 Erb
2003/0217946 A1 11/2003 Hsu
2004/0182916 A1 9/2004 Roseth
2005/0051461 A1 3/2005 Bryant
2005/0124521 A1 6/2005 Sadlowski et al.
2005/0150788 A1 7/2005 Feusner
2007/0074993 A1 4/2007 Philips
2007/0178194 A1 8/2007 Everard
2008/0269034 A1 10/2008 Stier
2009/0039144 A1 * 2/2009 Hooi ...................... B65D 5/248
229/148
2009/0186132 A1 7/2009 Mangino et al.
2010/0065620 A1 3/2010 Smith
2011/0240653 A1 10/2011 Castner et al.
2012/0234904 A1 9/2012 Costanzo, Jr.
2014/0203070 A1 7/2014 Lee
2014/0263353 A1 9/2014 Bell
2014/0263600 A1 9/2014 Valencia
2016/0107830 A1 4/2016 Baryshyan
2018/0339807 A1 11/2018 Mobarhan
2019/0322409 A1 10/2019 Sill et al.
2020/0189806 A1 * 6/2020 Sill ........................ B65D 5/305
2022/0153469 A1 * 5/2022 Mayer .................. B65D 5/2061

OTHER PUBLICATIONS

"Food packaging sleeves", Ostle & Maillard, 2019, 01 page.
Alibaba, "Black Disposable Divided Food Trays", Available from Internet, URL:https://thai.alibaba.com/product-detail/Airline-disposable-

(56) References Cited

OTHER PUBLICATIONS plastic-four-compartment-CPET-1238104653.html, Accessed on Apr. 3, 2017, Oct. 1, 2013, 9 pages.
Alibaba, "Disposable Plastic Two Compartment Food Container", https://www.alibaba.com/product-detail/Disposable-plastic-two-compartment-food-container 60599614850.html, 2018, 8 pages.
Amazon, "DART 205HT2, 9×6×3-Inch Performer White Two Compartment Foam Container with a Removable Hinged Lid, Carryout Food Disposable Containers", Available from internet, https://www.webstaurantstore.com/cambro-9113cw414-camwear-teal-9-x-11-3-compartment-meal-delivery-tray-case/2149113CWTE.html, Sep. 12, 2016, 6 pages.
Amazon, "Food Containers 3 Compartment Premium", Available from internet, URL:https://www.amazon.com/dp/B0741BQMY7/ref=sspa_dk_detail_2?psc=1%20&pd_rd_i=B0741BQMY7&pd_rd_wg=gDStp%20&pd_rd_r=ACEV1YJAC97ZZPCCXWCW&pd_rd_w=XZKlg, Jul. 18, 2017, 9 pages.
Amazon, "Freshware Meal Prep Containers [30 Pack] 3 Compartment with Lids, Food Storage Containers, Bento Box | BPA Free | Stackable | Microwave/Dishwasher/Freezer Safe (32 oz)", Feb. 13, 2019, 9 pages.
Amazon, "Pactiv RCL750200, 3-Compartment Aluminum Foil Pans Combo with Flat Foil Lids, Take Out Disposable Foil Containers with Matching Covers", Available at https://www.amazon.com/Pactiv-RCL750200-3-Compartment-Disposable-Containers/dp/B01LXOJ7BP/ref=sr_1_1?keywords=Pactiv+RCL750200&qid=1572606252&sr=8-1, Sep. 28, 2016, 5 pages.
Amazon, "Southern Champion Tray 0731 #1 ChampPak Classic Take-Out Container, Kraft Paperboard Coated Inside", Southern Champion Tray, Jan. 17, 2013, 1 page.
Amazon, "Southern Champion Tray 23133K Kraft Paperboard Lock Corner Window Bakery Box", Available from Internet https://www.amazon.com/gp/product/B008WCWJ9S/ref=s9_zwish_hd_bw_g328_i1?pf_rd_m=ATVPDKIKXODER&pf_rd_s=merchandised-search-5&pf_rd_r=OF299N2PNPMAY8WZM12D&pf_rd_t=101&pf_rd_p=22232752028pf_rd_i=5016466011, Mar. 15, 2013, 1 page.
Amazon, "50 Paper Food to Go Containers—51oz—New Design with Waist Seal Band—Eco Friendly Disposable Kraft Paper Take Out Food Container—Sturdy Leak & Grease Proof Microwavable Take Away Boxes", Available from internet, https://www.amazon.com/Paper-Food-Containers-Disposable-Microwavable/dp/B07M74VWXW, Nov. 5, 2019, 6 pages.
Blair Candy, "Empty Candy Boxes", Available from internet, https://www.blaircandy.com/emcabo.html, 2013, 1 page.
Dean Supply, "Disposable Takeout Containers", Jul. 18, 2017, 9 pages.
Flex Active Sports, "Buy 3-Compartment Food Prep Containers", Available from Internet, URL:http://flexactivesports.com/buy-3-compartment-food-prep-containers/, Jan. 5, 2016, 14 pages.
Glynn, Robin, "Origami Treasure Chest", Available from internet https://www.youtube.com/watch?v=WpgGqeBQvj4, Nov. 29, 2010, 1 page.
Importitall, "Southern Champion Tray 0761 #1", ChampPak Retro Take-Out, Jul. 13, 2017, 1 page.
Importitall, "Southern Champion Tray 0764 #4", ChampPak Retro Take-Out, Jul. 13, 2017, 1 page.
Inno-Pak, "Innobox Edge Insert", Oct. 25, 2016, 3 pages.
JCPak, "Cardboard Sleeves for Food Tray", Cartons and Boxes, Available from Internet, http://www.jchengpackage.com/Cartons_and_Boxes/28.html, 2018, 02 pages.
Kalifornia Love, "Extra Fruit Sensations Sweet Watermelon", Available from Internet, http://www.kalifornialove.com/2010/07/extra-fruit-sensations-sweet-watermelon.html, Jul. 28, 2010, 20 pages.
Nearof, "Review: Stride Spark Vitamin Chewing Gum", Available from Internet, http://www.nearof.com/review-stride-spark-vitamin-chewing-gum/, Sep. 7, 2011, 4 pages.
Placon, "Fresh n Clear Go Cubes Black Insert Tray", https://www.placon.com/products/stock-food-package/fresh-n-clear-gocubes-black-insert-tray/, 2016, 2 pages.
Robives, "Curved Lid Box", Nov. 2, 2013, 1 page.
Shutterstock, "Empty Food Tray Sleeve Packaging with Handles and Blueprint Template", Available from Internet, https://www.shutterstock.com/image-illustration/empty-food-tray-sleeve-packaging-handles-288654425?rid=928534, 08 pages.
Splash Packaging, "Natural Kraft Windowed Boxes", Available from Internet, https://www.splashpackaging.com/window-bakery-boxes-kraft.html, Oct. 4, 2014, 1 page.
The Delaware Gazette, "Inno-Pak is Staying Put", Available from Internet, https://www.delgazette.com/news/295/inno-pak-is-staving-put, accessed on Dec. 11, 2015, Jun. 13, 2015, 1 page.
The Dumbbelle, "Fitness Meal Prep Containers for Healthy Living", Available from Internet, https://thedumbbelle.com/fitness-meal-prep-containers/, Accessed on May 3, 2019, 9 pages.
Webstaurant Store, "Cambro 9113CW414 Camwear Teal 9"×11" 3 Compartment Meal Delivery Tray", Available from Internet, <URL : https://www.webstaurantstore.com/cambro-9113cw414-camwear-teal-9-x-11-3-compartment-meal-delivery-tray-case/2149113CWTE.html>, Mar. 14, 2010, 4 pages.
webstaurantstore.com, "Choice 7¾"×5½"×2" Kraft Microwavable Folded Paper #2 Take-Out Container—200/Case", Available from Internet, https:/www.webstaurantstore.com/choice-8-1-2-x-6-x-2-kraft-microwavable-folded-paper-2-take-out-container-case/795PTOKFT2.html, 6 pages.
Westrock, "Fold-Pak—Bio-Plus Earth", Available from Internet, http://www.fold-pak.com/products/Bio-PlusEarth.htm, Nov. 5, 2019, 2 pages.
Youtube, "Inno-Pak Rigid Microwavable Take Out Containers", Available from Internet, URL:https://www.youtube.com/watch?v=WoIGFg_sHSk, Sep. 17, 2014, 1 page.

* cited by examiner

CLOSEABLE CARTON

RELATED APPLICATIONS

This application is a continuation patent application of U.S. patent application Ser. No. 29/727,102, filed Mar. 9, 2020, the disclosure of which is incorporated herein by reference in its entirety.

TECHNICAL FIELD

The subject matter of the invention relates generally to carry-out food cartons, and more particularly to a closeable carton with a hinged lid and webbed corners and method of using same.

BACKGROUND

Various products are known to be purchased by consumers which require a carton for ease of transport. For example, in the food and grocery industry it is common to place food items in individual carry-out food cartons. There may be certain drawbacks to commonly used carry-out food cartons. For example, cardboard-, paper-, and/or paperboard-based cartons may not be suitable for holding wet foods reliably without leaking. Further, often carry-out food cartons are not designed for reliable stacking.

SUMMARY

In one embodiment, a closeable carton is provided. The closeable carton may include a floor panel and a plurality of side panels extending about a periphery of the floor panel. The plurality of side panels may include a front side panel, an opposing rear side panel, a first end panel, and an opposing second end panel, wherein the front side panel may include a front tab formed at an upper edge thereof, and wherein the first end panel and the second end panel each may include an upper side flap extending from an upper edge thereof, and wherein each flap may include a side receiving slot formed therein. The closeable carton may further include foldable corner gussets extending between adjacent side panels, wherein the floor panel, side panels, and foldable corner gussets are configurable to form a compartment region. The closeable carton may further include a hingeable lid, that may include a lid panel, a front edge flap extending from a front edge of the lid panel, a side tab formed on each opposing side edge of the lid panel, and a front receiving slot formed in the front edge flap, wherein the lid panel may be configured to cover the compartment region when in a closed position, and wherein the front tab of the front side panel is sized, shaped, and positioned such that when the hingeable lid is in the closed position, the front tab aligns with the front receiving slot and is receivable therein and each side tab aligns with its respective side receiving slot and are receivable therein. Adjacent side panels and end panels may be coupled together via the foldable corner gussets. The front receiving slot may be configured such that when the hingeable lid is in the closed position the front receiving slot is engageable with the front tab to secure the hingeable lid in the closed position. Each side receiving slot may be configured such that when the hingeable lid is in the closed position each side receiving slot is engageable with its respective side tab. Each side tab may be formed proximate to opposing side edges of the lid panel. The hingeable lid panel may be hingeably coupled to a top edge of the rear side panel via a fold line. The flap of each of the first end panel and the second end panel and the front edge flap of the hingeable lid may be configured to fold inward. The front edge flap of the hingeable lid may be configured to tuck behind the front side panel when the hingeable lid is in the closed position. The foldable corner gussets may each include a first side portion and an adjacent second side portion, wherein the first side portion and the second side portions intersect at a fold line therebetween. The foldable corner gussets may be configured to be folded along their respective fold lines such that opposing faces of adjacent first and second side portions come in contact with one another. The folded foldable corner gussets may be configured to be further folded such that an interior or exterior facing surface of one of the first or second side portions comes in contact with an interior or exterior surface of its corresponding adjacent side panel. An adhesive or heat sealable coating may hold the folded adjacent first and second side portions in contact with one another. An adhesive or heat sealable coating may hold the folded corner gusset in contact with the interior or exterior surface of its corresponding adjacent side panel. The carton may further include one or more vent flaps formed in one or more of the plurality of side panels. The one or more vent flaps may be formed in at least one of the front side panel and/or the rear side panel. The one or more vent flaps may be defined by a perforation or score line about at least a portion of its periphery, wherein the one or more vent flaps may be one of partially or fully removable.

In another embodiment, a method of using a closeable carton is provided. The method may include providing a closeable carton; folding each of the upper side flaps and the front edge flap inward; folding the hingeable lid to the closed position; tucking the front edge flap behind the front side panel; and engaging the front tab of the front side panel with the front receiving slot of the hingeable lid and/or one or more of the side tabs of the hinged carton lid with its respective one or more of the side receiving slots of the upper edge flaps. The carton may include one or more vent flaps formed in one or more of the plurality of side panels. The method may further include partially or fully removing one or more of the one or more vent flaps.

BRIEF DESCRIPTION OF THE DRAWINGS

Figure 1:
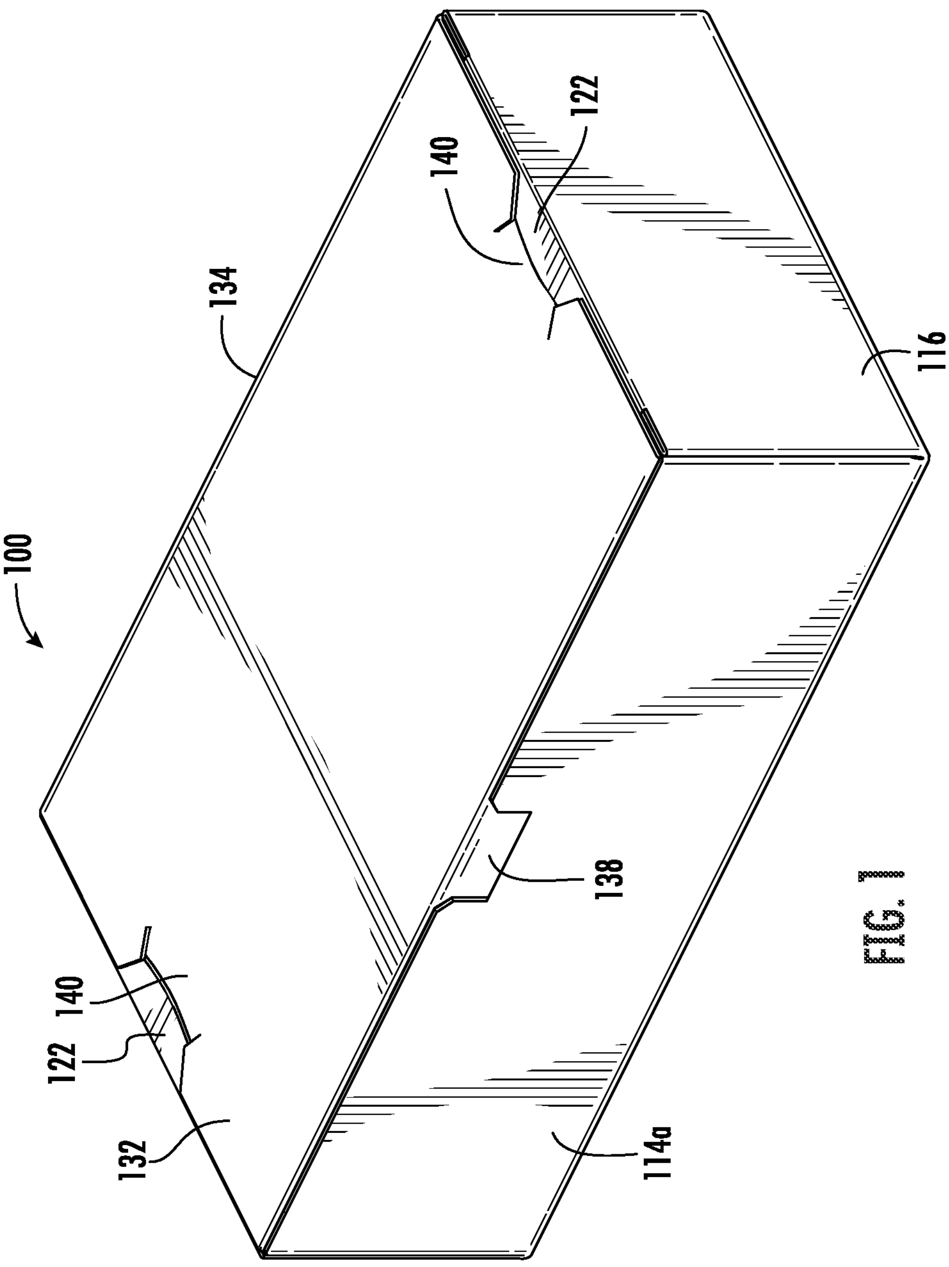
Figure 2:
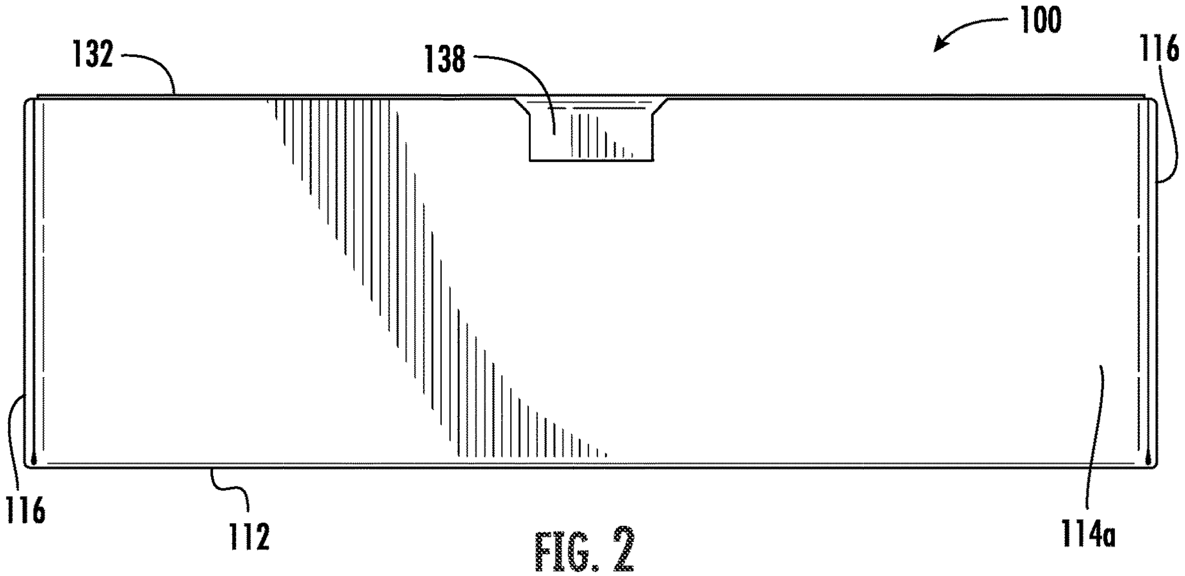
Figure 3:
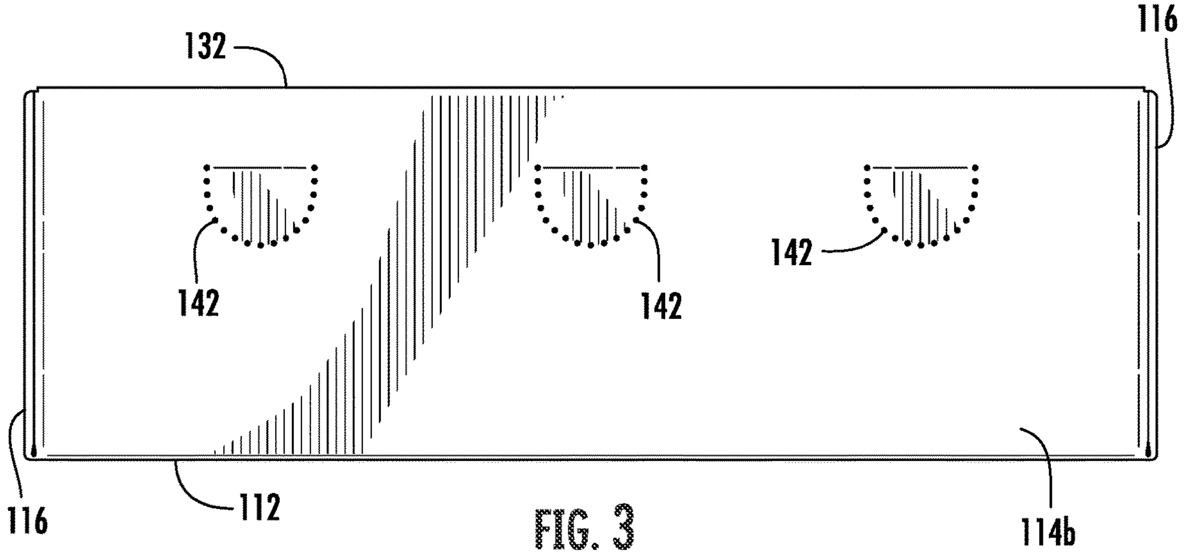
Figure 4:
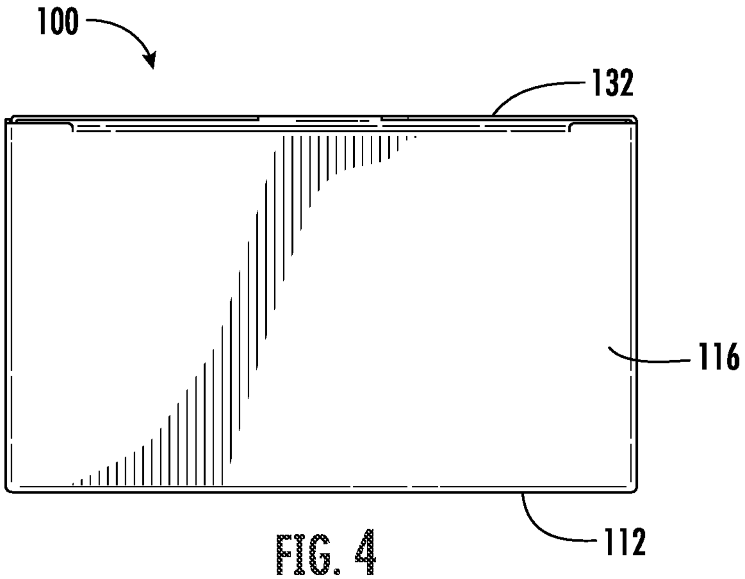
Figure 5:
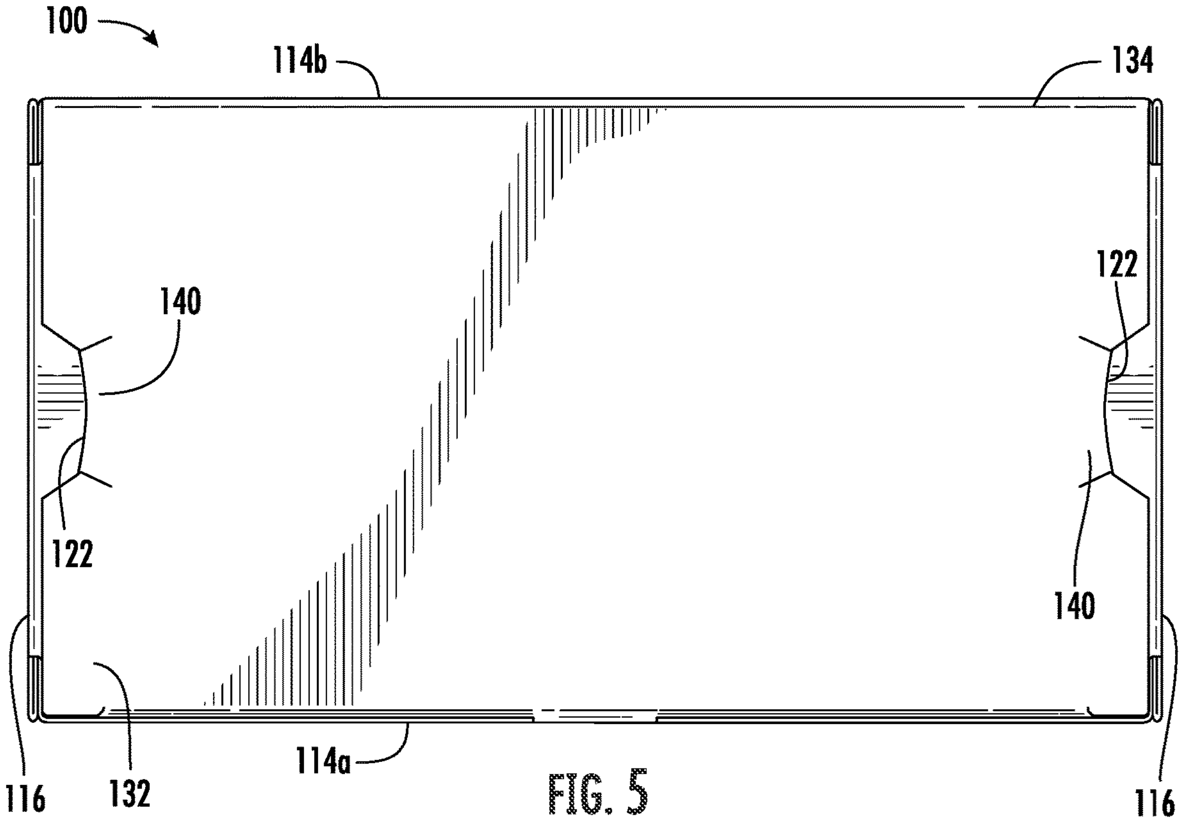
Figure 6:
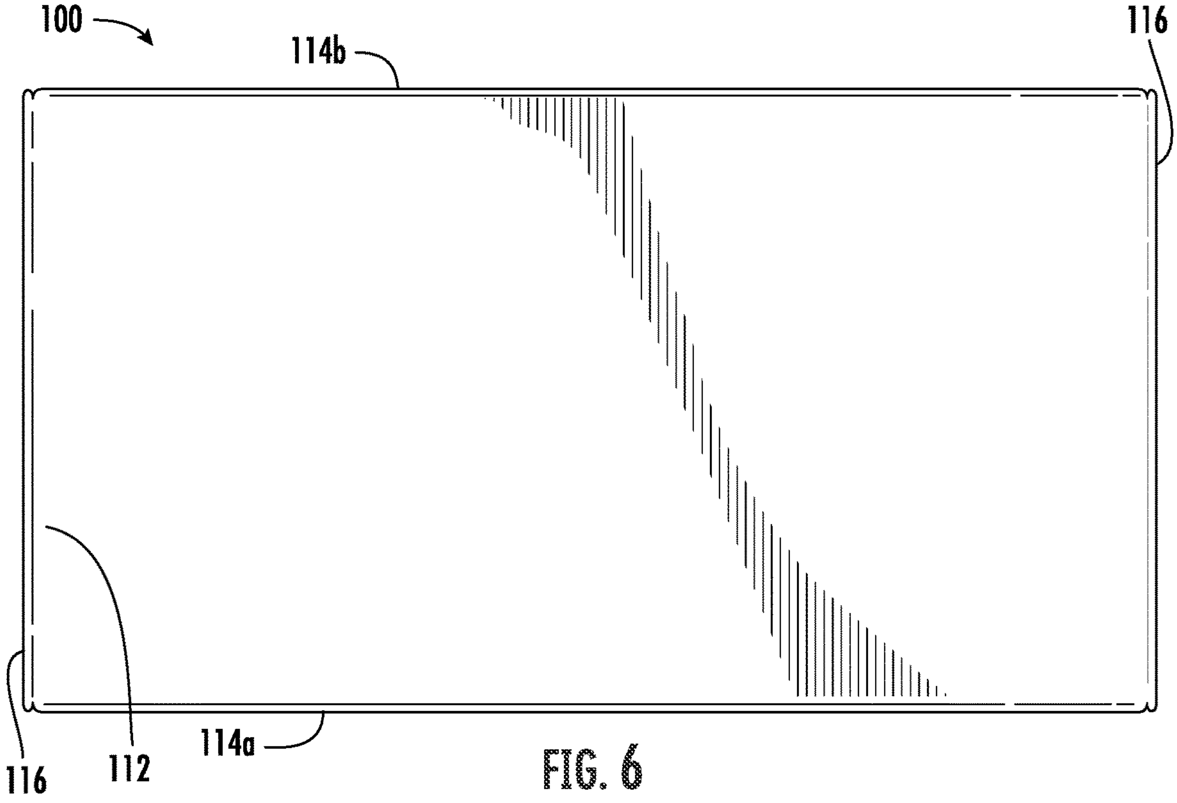
Figure 7:
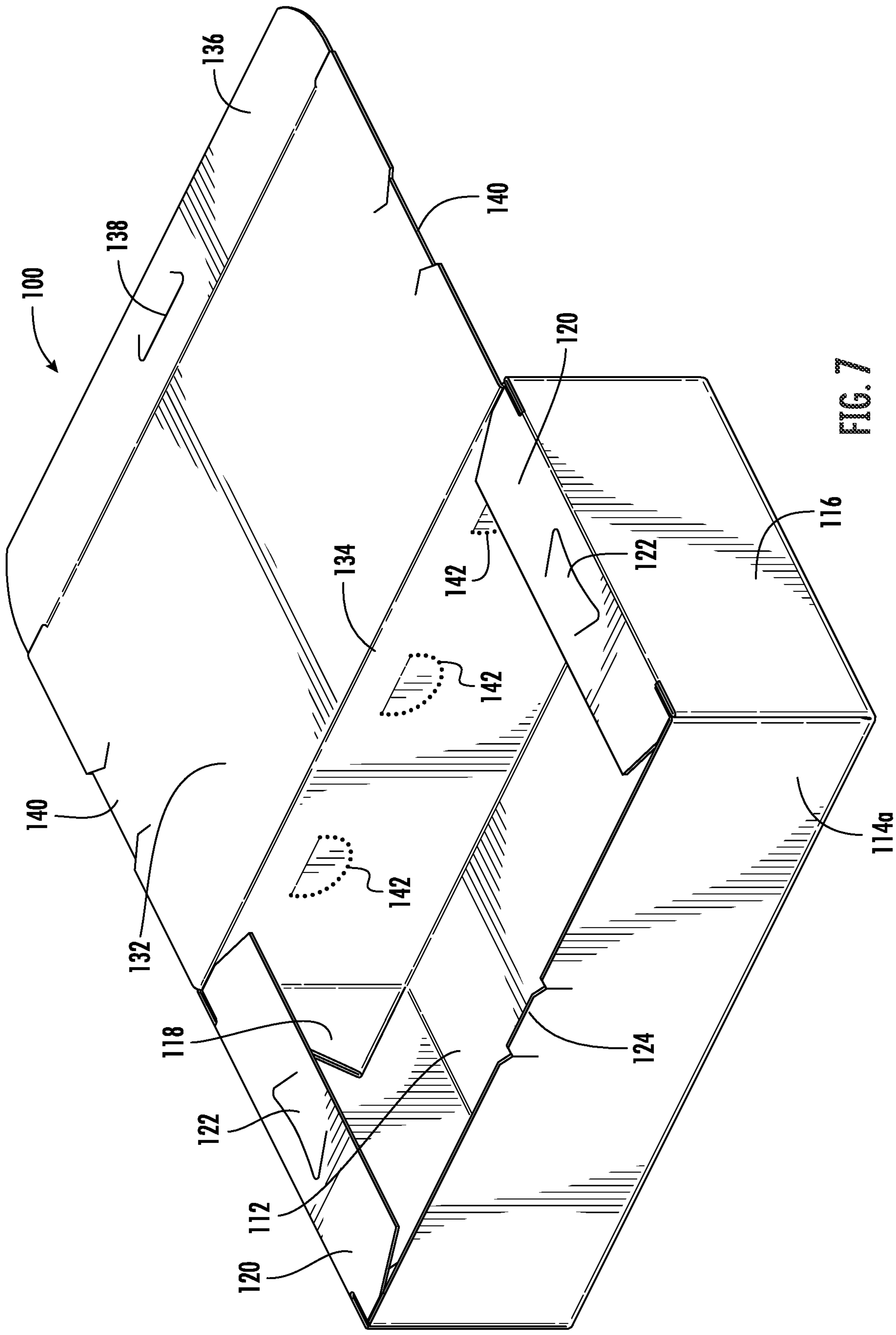
Figure 8:
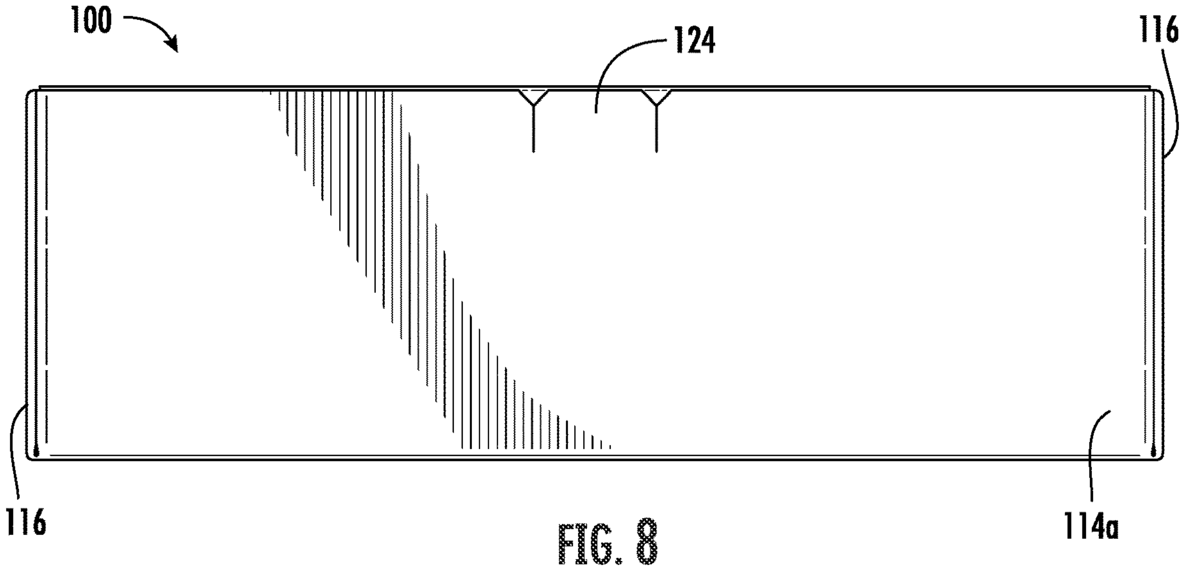
Figure 9:
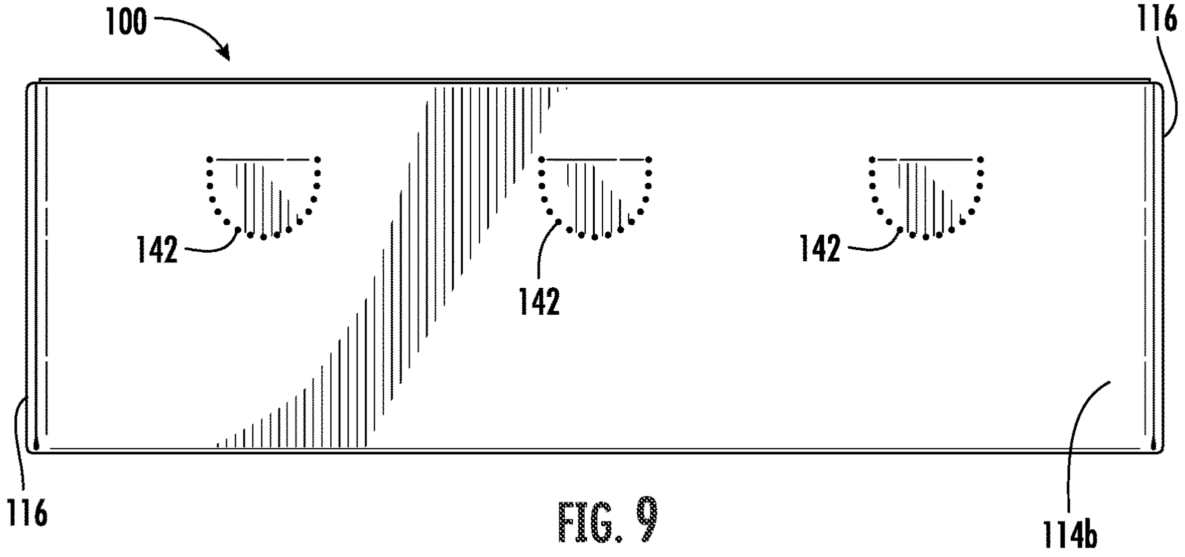
Figure 10:
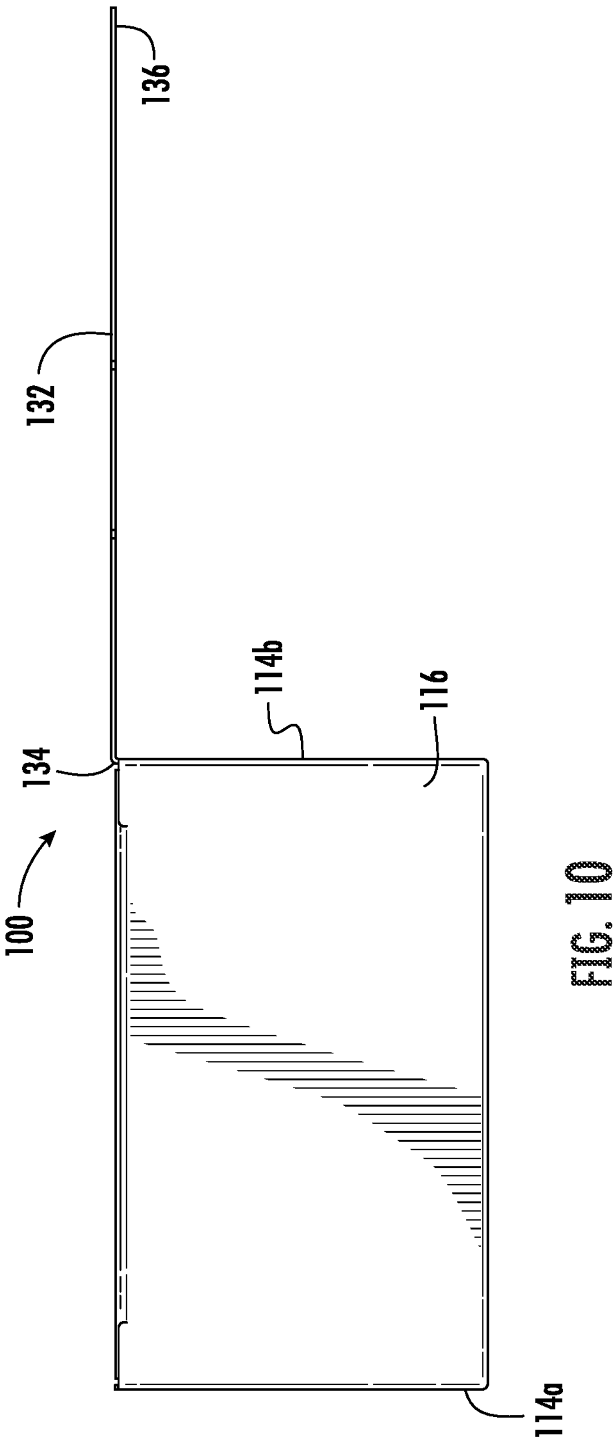
Figure 11:
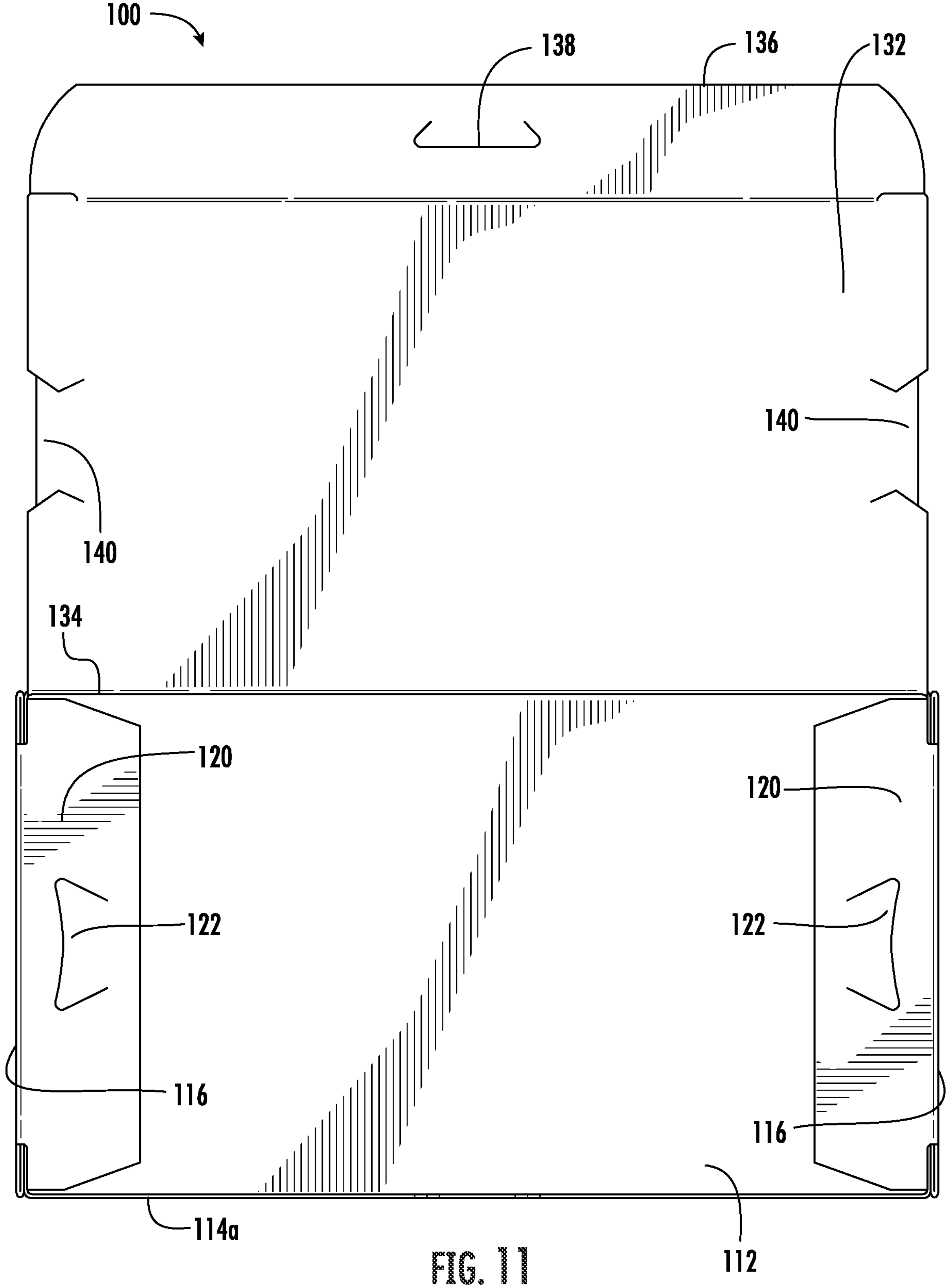
Figure 12:
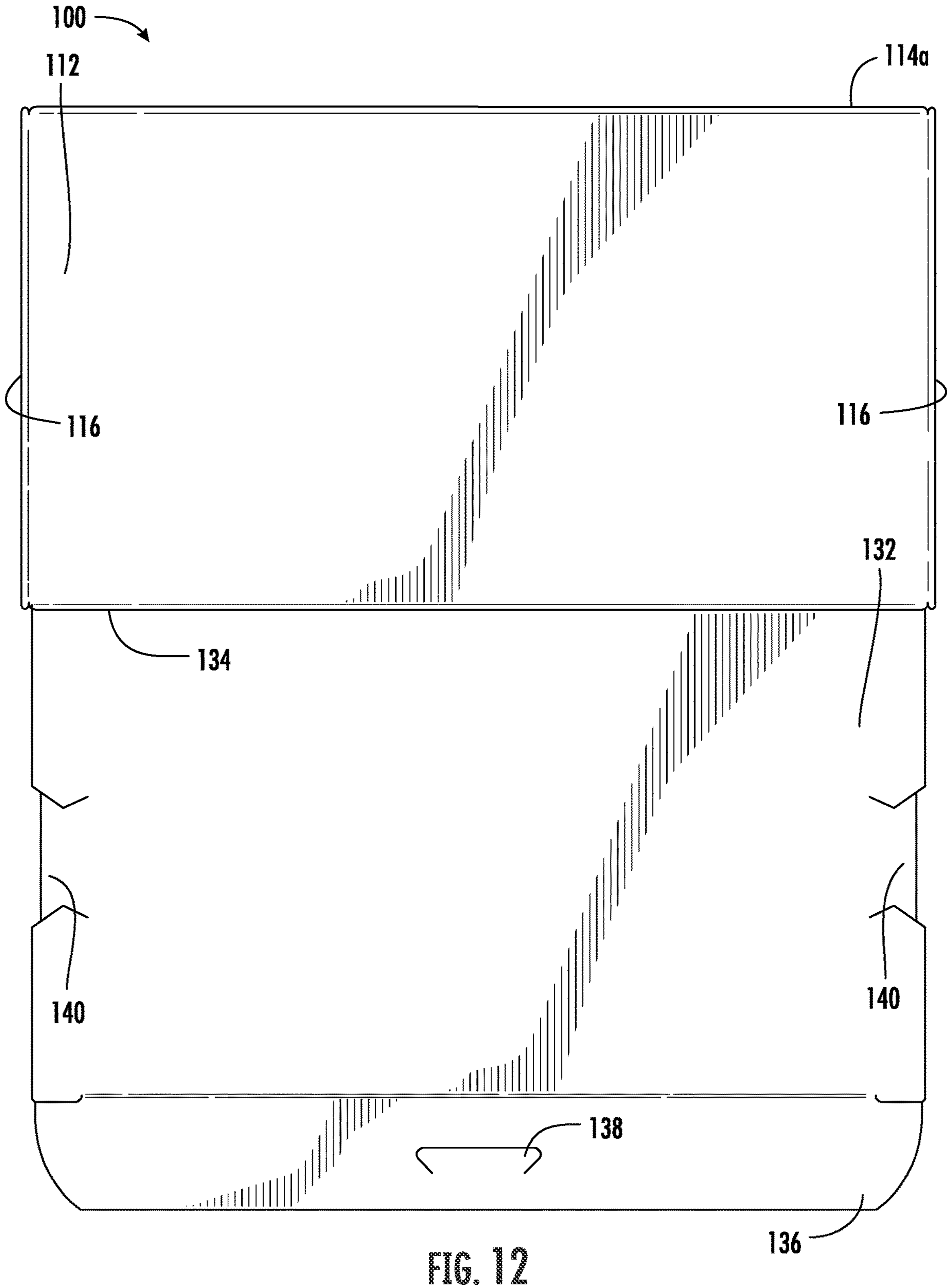
Figure 13:
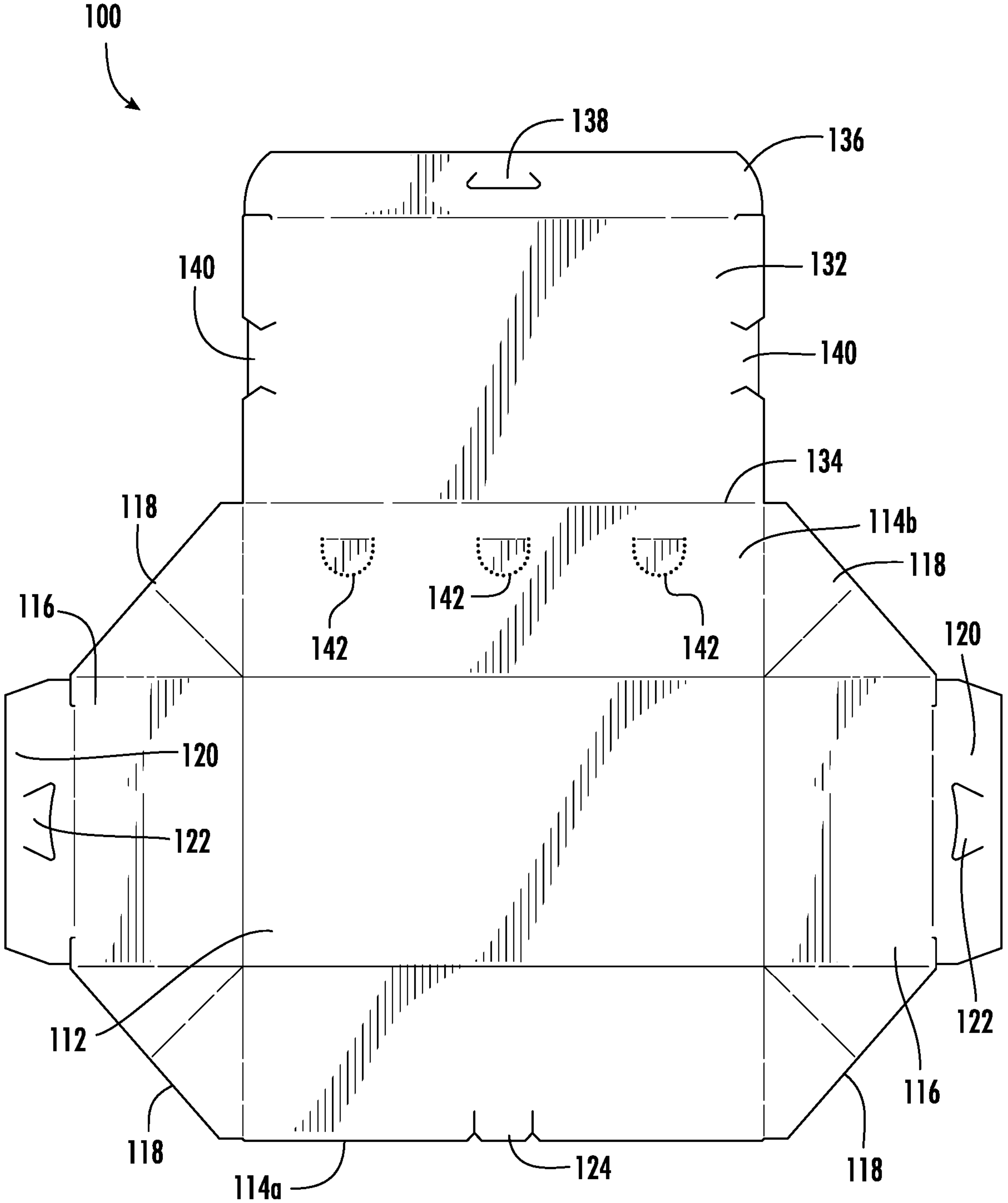
Figure 14:
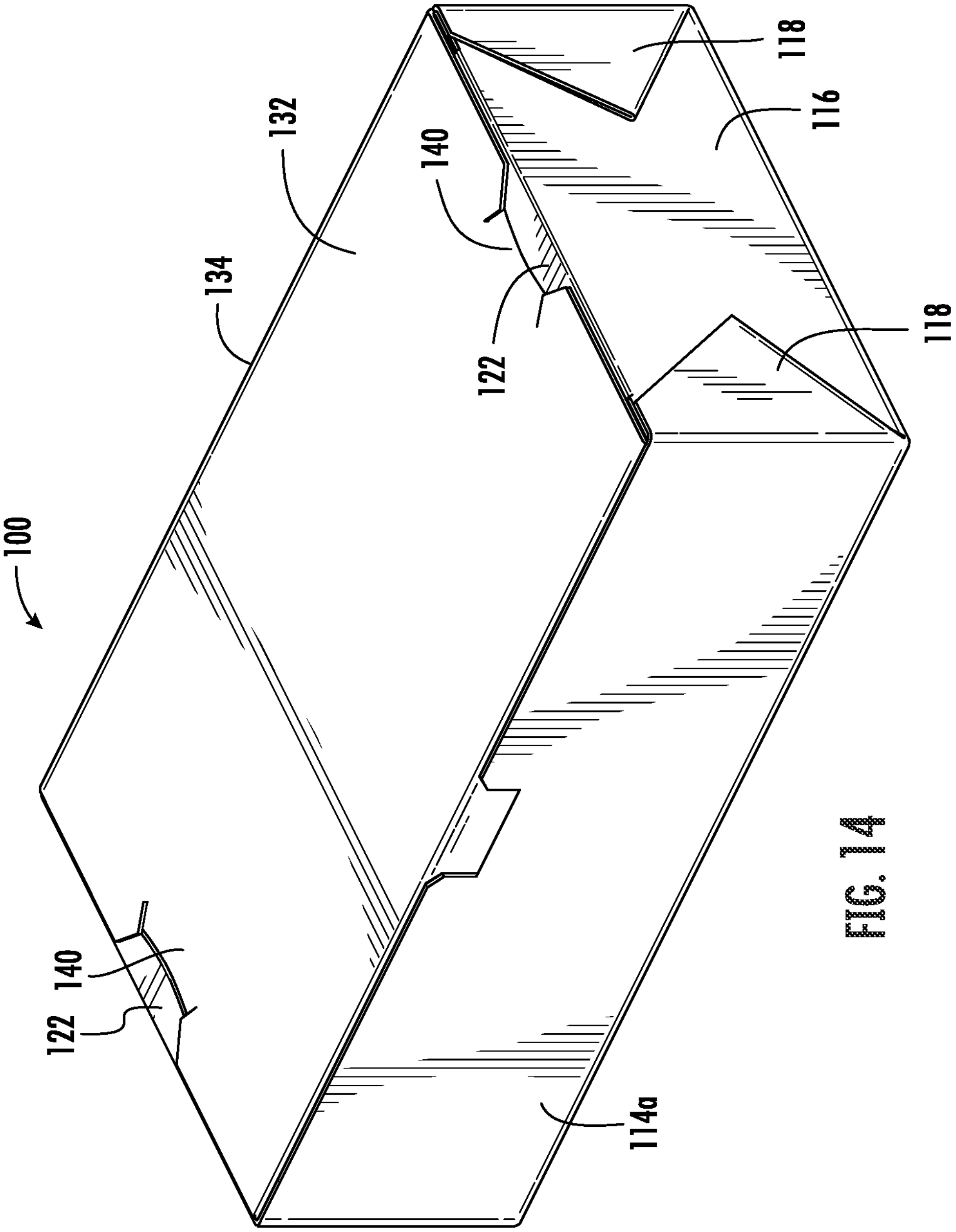
Figure 15:
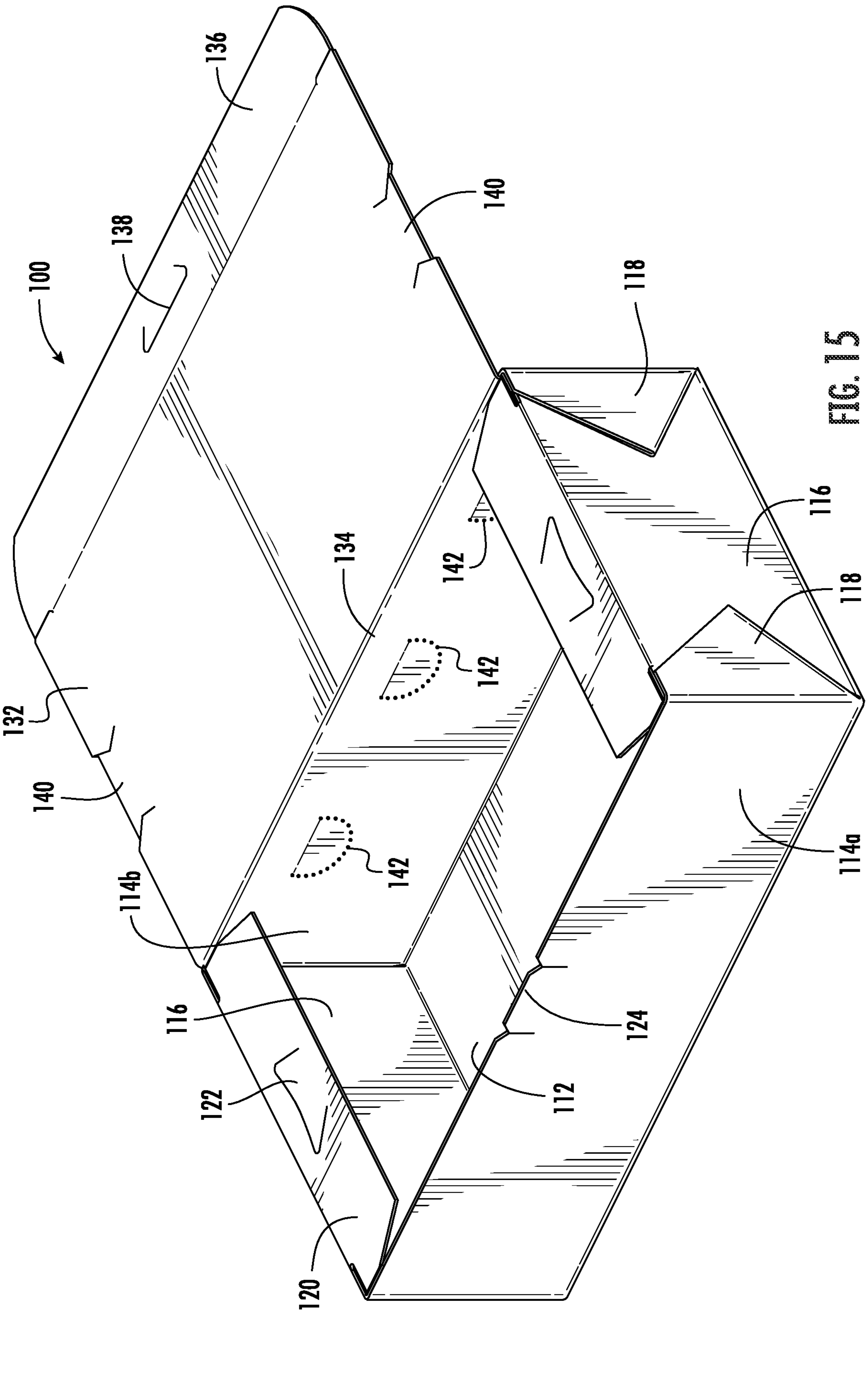
Figure 16:
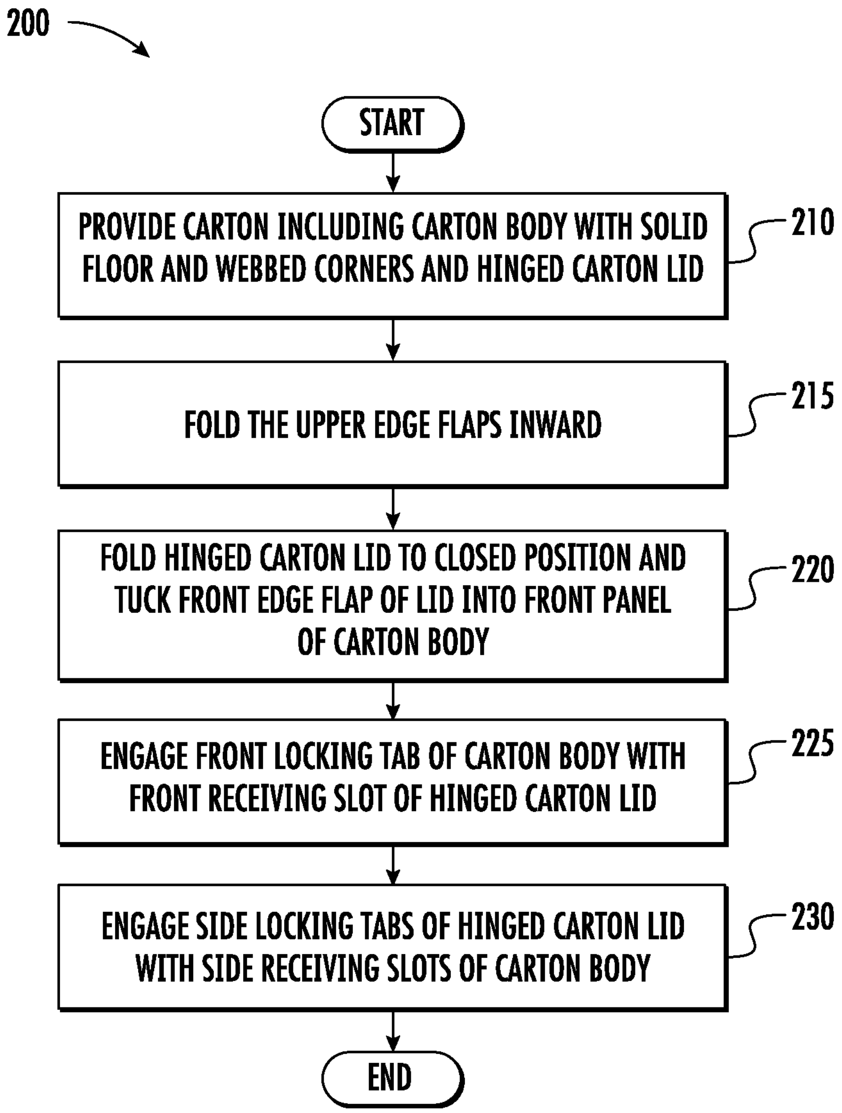

Having thus described the subject matter of the invention in general terms, reference will now be made to the accompanying Drawings, which are not necessarily drawn to scale, and wherein:

FIG. 1 is a perspective view of an example closeable carton, in accordance with an embodiment of the invention;

FIG. 2 is a front elevation view of the closeable carton of FIG. 1, in accordance with an embodiment of the invention;

FIG. 3 is a rear elevation view of the closeable carton of FIG. 1, in accordance with an embodiment of the invention;

FIG. 4 is a side elevation view of the closeable carton of FIG. 1, in accordance with an embodiment of the invention;

FIG. 5 is a top plan view of the closeable carton of FIG. 1, in accordance with an embodiment of the invention;

FIG. 6 is a bottom plan view of the closeable carton of FIG. 1, in accordance with an embodiment of the invention;

FIG. 7 is another perspective view of the closeable carton of FIG. 1 shown in an example open configuration, in accordance with an embodiment of the invention;

FIG. 8 is a front elevation view of the closeable carton of FIG. 7, in accordance with an embodiment of the invention;

FIG. 9 is a rear elevation view of the closeable carton of FIG. 7, in accordance with an embodiment of the invention;

FIG. 10 is a side elevation view of the closeable carton of FIG. 7, in accordance with an embodiment of the invention;

FIG. 11 is a top plan view of the closeable carton of FIG. 7, in accordance with an embodiment of the invention;

FIG. 12 is a bottom plan view of the closeable carton of FIG. 7, in accordance with an embodiment of the invention;

FIG. 13 is a top plane view of the of the closeable carton of FIG. 1 shown in an example flat unfolded configuration, in accordance with an embodiment of the invention;

FIG. 14 is another perspective view of the closeable carton of FIG. 1 showing an example alternate configuration, in accordance with an embodiment of the invention;

FIG. 15 is another perspective view of the closeable carton of FIG. 14 shown in an example open configuration, in accordance with an embodiment of the invention; and FIG. 16 illustrates a flow diagram of an example of a method of using the closeable carton, in accordance with an embodiment of the invention.

DETAILED DESCRIPTION

The subject matter of the invention now will be described more fully hereinafter with reference to the accompanying Drawings, in which some, but not all embodiments of the subject matter of the invention are shown. Like numbers refer to like elements throughout. The subject matter of the invention may be embodied in many different forms and should not be construed as limited to the embodiments set forth herein; rather, these embodiments are provided so that this disclosure will satisfy applicable legal requirements. Indeed, many modifications and other embodiments of the subject matter of the invention set forth herein will come to mind to one skilled in the art to which the subject matter of the invention pertains having the benefit of the teachings presented in the foregoing descriptions and the associated Drawings. Therefore, it is to be understood that the subject matter of the invention is not to be limited to the specific embodiments disclosed and that modifications and other embodiments are intended to be included within the scope of the appended claims.

In some embodiments, the subject matter of the invention provides a closeable carton with a hinged lid and webbed corners and method of using same. In one example, the subject closeable carton includes a carton body and a hinged carton lid, and wherein the carton body includes a solid floor panel and webbed corners. Accordingly, the subject carton may be used as a disposable food carry-out (or take-out) carton that is suitable for holding wet foods reliably for some useful period of time.

In some embodiments, the carton body and/or hinged carton lid of the subject carton may include various tabs and slots that may be engaged for holding shut the hinged carton lid to the carton body.

In some embodiments, the subject carton includes a substantially flat hinged carton lid that allows for easy stacking of multiple of the subject cartons.

In some embodiments, the webbed corners of the subject carton may be held by glue or other adhesive.

In some embodiments, the webbed corners of the subject carton may be held by heat-sealable coatings, wherein the carton body may be folded into its assembled state and the corner flaps folded and heat sealed to an inside or outside surface of the assembled carton body without adding any glue, thereby providing a fully compostable carton.

Additionally, a method of using the subject carton is provided.

In some embodiments, the carton body and/or the hinged carton lid of the subject carton may include a tamper-evident feature that may be used to indicate a "secure" condition of the carton and wherein the tamper-evident feature may be, for example, a perforated tear line, a tear-away strip, and/or the like.

Referring now to FIGS. 1 through 15, show various views and embodiments of an example of the subject carton 100 that may have a hinged lid 130, webbed corners 118, and a solid carton bottom. The carton 100 may be a used, for example, as a disposable food carry-out (or take-out) carton that is openable and closable.

The carton 100 may include a carton body 110 and a hinged carton lid 130. The carton body 110 may further include a floor panel 112, two opposing side panels 114 (e.g., a front side panel 114*a* and a rear side panel 114*b*), and two opposing end panels 116. The ends of the side panels 114 and the end panels 116 may be coupled via webbed corners 118. The webbed corners 118 may be, for example, a webbed corner inside glue design, wherein the webbed corners 118 may be adhered to an interior surface of their adjacent end panel 116 or side panel 114 (as shown, for example, in FIG. 7). Alternatively, the webbed corners 118 may be, for example, a webbed corner outside glue design, wherein the webbed corners 118 may be adhered to an exterior surface of their adjacent end panel 116 or side panel 114 (as shown, for example, in FIG. 14). The webbed corners 118 may be secured, for example, via an adhesive, thermal bonding, or any other suitable technique or mechanism. Each of the end panels 116 may include an upper edge flap 120. Each of the upper edge flaps 120 may include a side receiving slot 122. Further, a front locking tab 124 may be provided at the top edge of the front side panel 114*a*.

The hinged carton lid 130 may be a substantially flat hinged carton lid. The hinged carton lid 130 may include a lid panel 132 that may be hingeably coupled to the top edge of the rear side panel 114*b* of the carton body 110 via a fold line 134. A front edge flap 136 may be provided at the front edge of the lid panel 132. The front edge flap 136 of the lid panel 132 may include a front edge receiving slot 138. Further, a side locking tab 140 may be provided at each opposing end of lid panel 132.

The front edge receiving slot 138 of the hinged carton lid 130 may be designed to receive and hold the front locking tab 124 of the carton body 110. The side receiving slots 122 of the carton body 110 may be designed to receive and hold the side locking tabs 140 of the hinged carton lid 130. Further, the rear side panel 114*b* may include one or more vent flaps 142 (as shown, for example, in FIGS. 3, 7, 9, 13, 15).

The carton body 110 and the hinged carton lid 130 of the carton 100 may be formed of any lightweight, rigid or semi-rigid material that is suitable for holding and/or transporting, for example, a quantity of food and that is also suitable for disposing of after use. For example, the carton 100 may be formed of corrugated cardboard, paper, paperboard, post-consumer paperboard (i.e., recycled materials), biodegradable materials (e.g., sugarcane and paper), polystyrene foam (e.g., Styrofoam), plastic, molded fiber, and the like.

In operation, a user may fold the hinged carton lid 130 to a closed position and tucks the front edge flap 136 of the lid panel 132 behind the front side panel 114*a* of the carton body 110. Then, the user may engage the front locking tab 124 of the carton body 110 with the front edge receiving slot 138 of the hinged carton lid 130. Then, the user may engage the side locking tabs 140 of the hinged carton lid 130 with the side receiving slots 122 of the carton body 110.

One benefit of the presently disclosed carton 100 is that the carton body 110 has a solid floor panel 112 and that the carton body 110 is formed using the webbed corners 118 to form a disposable food carry-out (or take-out) carton that is suitable for holding wet foods reliably for some useful period of time without leaking.

For example, to form the carton body 110, the webbed corners 118 may be folded inward. Then, glue or other adhesive may be applied inside the fold such that facing surfaces of the webbed corners 118 are adhered or otherwise bonded together. In another example, a heat-sealable coating may be applied to the surfaces inside the fold of the webbed corners 118. Then, for each webbed corner 118, once the facing surfaces of the webbed corner 118 are folded into contact with one another, heat may be applied to the folded area and causing the heat-sealable coating to bond the facing surfaces of the webbed corner 118 together. Once the facing surfaces of the webbed corners 118 are adhered or otherwise bonded together, the folded webbed corners 118 may then be folded over in contact with an inside surface of its adjacent end panel 116 or side panel 114 and adhered or otherwise bonded thereto. Glue or other adhesive may be used to adhere or otherwise bond folded webbed corners 118 to the inside surface its adjacent end panel 116 or side panel 114. In another example, a heat-sealable coating may be applied to all or select surfaces of the interior facing surface of the carton body 110, and once the webbed corner 118 are folded into contact with the inside surface its adjacent end panel 116 or side panel 114, heat may be applied to the area and causing the heat-sealable coating to bond the webbed corner 118 thereto.

In another embodiment, to form the carton body 110, the webbed corners 118 may be folded outward. Then, glue or other adhesive may be applied inside the fold such that facing surfaces of the webbed corners 118 are adhered or otherwise bonded together. In another example, a heat-sealable coating may be applied to the surfaces inside the fold of the webbed corners 118. Then, for each webbed corner 118, once the facing surfaces of the webbed corner 118 are folded into contact with one another, heat may be applied to the folded area and causing the heat-sealable coating to bond the facing surfaces of the webbed corner 118 together. Once the facing surfaces of the webbed corners 118 are adhered or otherwise bonded together, the folded webbed corners 118 may then be folded over in contact with an outside surface of its adjacent end panel 116 or side panel 114 and adhered or otherwise bonded thereto (for example as shown in FIGS. 14 an 15). Glue or other adhesive may be used to adhere or otherwise bond folded webbed corners 118 to the outside surface of its adjacent end panel 116 or side panel 114. In another example, a heat-sealable coating may be applied to all or select surfaces of the exterior facing surface of the carton body 110, and once the webbed corner 118 are folded into contact with the exterior surface of its adjacent end panel 116 or side panel 114, heat may be applied to the area and causing the heat-sealable coating to bond the webbed corner 118 thereto.

Another benefit of the presently disclosed carton 100 is that the substantially flat hinged carton lid 130 allows for easy stacking of multiple of the cartons 100.

Referring now to FIG. 16 is a flow diagram of an example of a method 200 of using the presently disclosed carton 100. The method 200 may include, but is not limited to, the following steps, and not necessarily in the following order.

At a step 210, the carton 100 is provided.

At a step 215, a user may fold the upper edge flaps 120 inward.

At a step 220, a user may fold the hinged carton lid 130 to the closed position and tuck the front edge flap 136 of the lid panel 132 into the front side panel 114*a* of the carton body 110.

At a step 225, the user may engage the front locking tab 124 of the carton body 110 with the front edge receiving slot 138 of the hinged carton lid 130.

At a step 230, the user may engage one or both of the side locking tabs 140 of the hinged carton lid 130 with one or more of the side receiving slots 122 of the upper edge flaps 120 of the carton body 110.

In other embodiments, the carton body 110 and/or the hinged carton lid 130 of the presently disclosed carton 100 may include a tamper-evident feature (not shown) that may be used to indicate a “secure” condition of the carton 100. For example, the tamper-evident feature may be a perforated tear line, a tear-away strip, and/or the like. In one example, when the perforated tear line or tear-away strip is fully intact, the carton 100 is in the “secure” condition. By contrast, when the perforated tear line or tear-away strip is shown to be compromised, the carton 100 is in a “tamper-evident” condition.

Following long-standing patent law convention, the terms “a,” “an,” and “the” refer to “one or more” when used in this application, including the claims. Thus, for example, reference to “a subject” includes a plurality of subjects, unless the context clearly is to the contrary (e.g., a plurality of subjects), and so forth.

Throughout this specification and the claims, the terms “comprise,” “comprises,” and “comprising” are used in a non-exclusive sense, except where the context requires otherwise. Likewise, the term “include” and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term “about” even though the term “about” may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term “about,” when referring to a value can be meant to encompass variations of, in some embodiments±100%, in some embodiments±50%, in some embodiments±20%, in some embodiments±10%, in some embodiments±5%, in some embodiments±1%, in some embodiments±0.5%, and in some embodiments±0.1% from the specified amount, as such variations are appropriate to perform the disclosed methods or employ the disclosed compositions.

Further, the term “about” when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. A carton, comprising:

a. a floor panel;

b. a plurality of side panels extending about a periphery of the floor panel, the plurality of side panels comprising a front side panel, an opposing rear side panel, a first end panel, and an opposing second end panel, wherein the front side panel comprises a single front tab formed and centered at an upper edge thereof, wherein a top edge of the front tab is substantially flush with a top edge of the front side panel, and wherein the first end panel and the second end panel each comprise an upper side flap extending from an upper edge thereof, and wherein each flap comprises a side receiving slot formed therein, and wherein each corner fold line between each side panel side edge and its adjacent foldable corner gussets are formed at a substantially 90 degree angle with respect to each fold line between each side panel and the floor panel, and wherein in a folded assembled state the side panels are configured at a substantially 90 degree angle with respect to the floor panel;

c. foldable corner gussets extending between adjacent side panels, wherein the floor panel, side panels, and foldable corner gussets are configurable to form a compartment region;

d. a hingeable lid, comprising: a lid panel, a front edge flap extending from a front edge of the lid panel, a side tab formed on each opposing side edge of the lid panel, and a single front receiving slot formed in the front edge flap, wherein the front receiving slot is disposed between a front edge of the front edge flap and the front edge of the lid panel, and wherein the lid panel is configured to cover the compartment region when in a closed position; and wherein the front tab of the front side panel is sized, shaped, and positioned such that when the hingeable lid is in the closed position, the front tab aligns with the front receiving slot and is receivable therein and each side tab aligns with its respective side receiving slot and are receivable therein.

2. The carton of claim 1, wherein adjacent side panels and end panels are coupled together via the foldable corner gussets.

3. The carton of claim 1, wherein the front receiving slot is configured such that when the hingeable lid is in the closed position the front receiving slot is engageable with the front tab to secure the hingeable lid in the closed position.

4. The carton of claim 1, wherein each side receiving slot is configured such that when the hingeable lid is in the closed position each side receiving slot is engageable with its respective side tab.

5. The carton of claim 1, wherein each side tab is formed proximate to opposing side edges of the lid panel.

6. The carton of claim 1, wherein the hingeable lid panel is hingeably coupled to a top edge of the rear side panel via a fold line.

7. The carton of claim 1, wherein the flap of each of the first end panel and the second end panel and the front edge flap of the hingeable lid are configured to fold inward.

8. The carton of claim 1, wherein the front edge flap of the hingeable lid is configured to tuck behind the front side panel when the hingeable lid is in the closed position.

9. The carton of claim 1, wherein the foldable corner gussets each comprise a first side portion and an adjacent second side portion, wherein the first side portion and the second side portions intersect at a fold line therebetween.

10. The carton of claim 9, wherein the foldable corner gussets are configured to be folded along their respective fold lines such that opposing faces of adjacent first and second side portions come in contact with one another.

11. The carton of claim 10, wherein the folded foldable corner gussets are configured to be further folded such that an interior or exterior facing surface of one of the first or second side portions comes in contact with an interior or exterior surface of its corresponding adjacent side panel.

12. The carton of claim 11, wherein an adhesive or heat sealable coating holds the folded corner gusset in contact with the interior or exterior surface of its corresponding adjacent side panel.

13. The carton of claim 10, wherein an adhesive or heat sealable coating holds the folded adjacent first and second side portions in contact with one another.

14. The carton of claim 1, further comprising one or more vent flaps formed in one or more of the plurality of side panels.

15. The carton of claim 14, wherein the one or more vent flaps are formed in at least one of the front side panel and the rear side panel.

16. The carton of claim 14, wherein the one or more vent flaps are defined by a perforation or score line about at least a portion of its periphery, wherein the one or more vent flaps are one of partially or fully removable.

17. A method of using a carton, comprising:

a. providing a carton, comprising:

i. a floor panel;

ii. a plurality of side panels extending about a periphery of the floor panel, the plurality of side panels comprising a front side panel, an opposing rear side panel, a first end panel, and an opposing second end panel, wherein the front side panel comprises a single front tab formed and centered at an upper edge thereof, wherein a top edge of the front tab is substantially flush with a top edge of the front side panel, and wherein the first end panel and the second end panel each comprise an upper side flap extending from an upper edge thereof, and wherein each flap comprises a side receiving slot formed therein, and wherein each corner fold line between each side panel side edge and its adjacent foldable corner gussets are formed at a substantially 90 degree angle with respect to each fold line between each side panel and the floor panel, and wherein in a folded assembled state the side panels are configured at a substantially 90 degree angle with respect to the floor panel;

iii. foldable corner gussets extending between adjacent side panels, wherein the floor panel, side panels, and foldable corner gussets are configurable to form a compartment region; and iv. a hingeable lid, comprising: a lid panel, a front edge flap extending from a front edge of the lid panel, a side tab formed on each opposing side edge of the lid panel, and a single front receiving slot formed in the front edge flap, wherein the front receiving slot is disposed between a front edge of the front edge flap and the front edge of the lid panel, and wherein the lid panel is configured to cover the compartment region when in a closed position, and wherein the front tab is sized, shaped, and positioned such that when the hingeable lid is in the closed position, the front tab aligns with the front receiving slot and is receivable therein and each side tab aligns with its respective side receiving slot and are receivable therein;

b. folding each of the upper side flaps and the front edge flap inward;

c. folding the hingeable lid to the closed position;

d. tucking the front edge flap behind the front side panel; and e. engaging the front tab of the front side panel with the front receiving slot of the hingeable lid and/or one or more of the side tabs of the hinged carton lid with its respective one or more of the side receiving slots of the upper edge flaps.

18. The method of claim 17, wherein carton further comprising one or more vent flaps formed in one or more of the plurality of side panels.

19. The method of claim 18, further comprising partially or fully removing one or more of the one or more vent flaps.

* * * * *